No. 722,243. PATENTED MAR. 10, 1903.
W. H. NOYES.
AUTOMOBILE CARRIAGE.
APPLICATION FILED JAN. 27, 1902.
NO MODEL.

Witnesses:
Charles F. Logan.
Walter E. Lombard.

Inventor:
William Herbert Noyes,
by Edward Dummer,
Atty.

UNITED STATES PATENT OFFICE.

WILLIAM HERBERT NOYES, OF NEWBURYPORT, MASSACHUSETTS, ASSIGNOR TO AMOS L. PRESCOTT, OF PASSAIC, NEW JERSEY.

AUTOMOBILE CARRIAGE.

SPECIFICATION forming part of Letters Patent No. 722,243, dated March 10, 1903.

Application filed January 27, 1902. Serial No. 91,500. (No model.)

*To all whom it may concern:*

Be it known that I, WILLIAM HERBERT NOYES, a citizen of the United States, residing at Newburyport, in the county of Essex and State of Massachusetts, have invented a new and useful Improvement in Automobile Carriages, of which the following is a specification, reference being had to the accompanying drawings.

My invention relates to the construction of the front part of an automobile carriage, the object of my invention being to provide a footboard and a dashboard so pivoted, supported, and shaped with reference to the body of the carriage that they when swung forward will be of a desirable form and in convenient position with reference to a front seat when the latter is required for use and when swung up may, together with the hinged back of the seat and the sides of the carriage, cover and inclose the seat, so that the front of the carriage will present a desirable form and appearance when the seat is not required.

Figure 1:
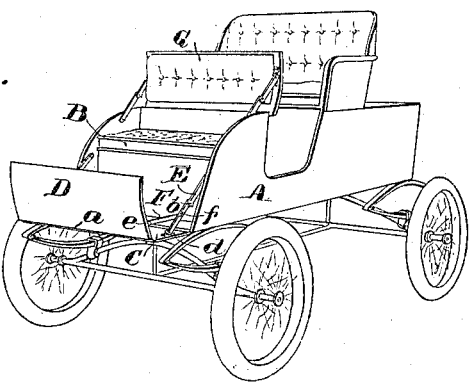
Figure 2:
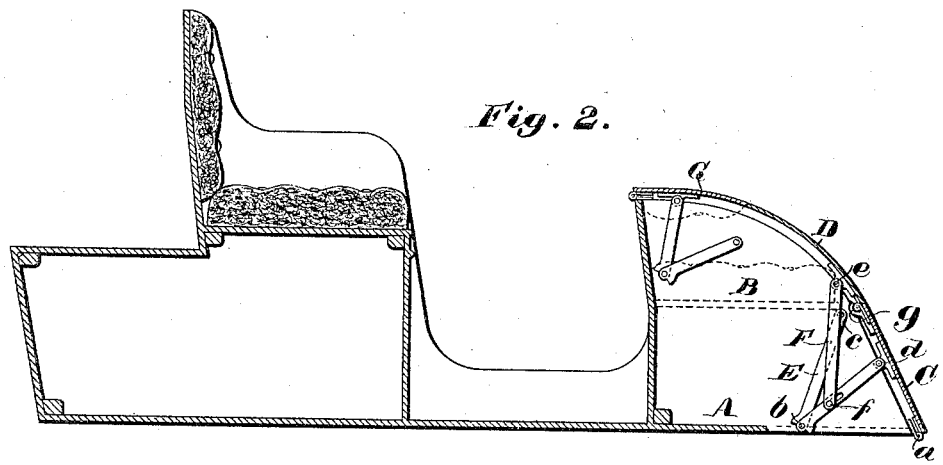

In the drawings, Figure 1 is a perspective view of so much of an automobile carriage embodying my invention as is sufficient to illustrate the same. Fig. 2 is a vertical longitudinal section, and Fig. 3 a side elevation, drawn on a larger scale than Fig. 1, showing the devices relating to my invention more in detail.

Figure 3:
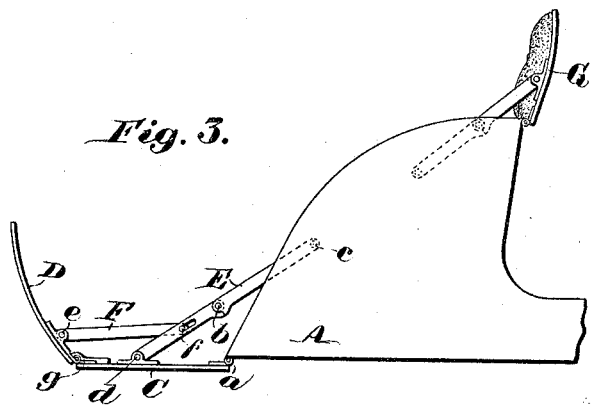

To the body A of the carriage, provided with a front seat B, I pivot a footboard C at $a$. To this footboard I pivot at its front edge a dashboard D. When the footboard and dashboard are in position for use as such, as shown in Figs. 1 and 3, the footboard is held in position by a brace E at each side of the carriage. Each brace is formed, preferably, of two rods pivoted to each other at $b$ and pivoted, respectively, to the carriage-body at $c$ and to the footboard at $d$. At the pivot $b$ these rods may be and preferably are so constructed that they will form an abutment or stop-knuckle, as shown, so as to render the projected footboard C substantially rigid.

At each end of the dashboard D is pivoted at $e$ a rod F, which is pivoted at the other end at $f$ to the brace E at that end of the dashboard. The rod E is slotted at $f$, so as to allow a slight lengthwise motion of the rod F with reference to the brace E in folding the dashboard and footboard. A stop or abutment $g$, Fig. 3, fastened in position on the footboard C to meet the dashboard D, will, together with the rod F, so lock the dashboard in its projected position, Figs. 1 and 3, as to hold the same firmly.

When the dashboard D and footboard C are swung up and the back G of the seat turned down, the back being hinged and supported, so as to fold forwardly, as shown in Fig. 2, the seat B is covered and inclosed by the three in series, the dashboard and footboard conforming to the lower portions of the front edges of the sides of the carriage and the seat to the upper portions of said edges. Thus the front of the carriage has the desired form and appearance when the front seat is not required for use. By having the dashboard pivoted to the footboard, while the latter is pivoted to the body of the carriage, as set forth, provision is made for a dashboard nearly or quite vertical while the footboard is nearly or quite horizontal, as is desirable and as in an ordinary carriage having these parts secured rigidly with reference to the body thereof.

I claim as my invention—

1. The combination of a carriage-body, a footboard pivoted to the front end of said body, a dashboard pivoted to the footboard, and supporting devices which maintain said footboard and dashboard in suitable relation to each other and to the seat when dropped down, said body having sides the front edges of which are conformed to said dashboard and footboard, and against which said dashboard and footboard are adapted to be folded.

2. The combination of a carriage-body, a seat therein, a footboard pivoted to said body, a dashboard pivoted to the footboard, supporting devices which maintain said footboard and dashboard in suitable relative positions when dropped down, and a back pivoted to said seat, the sides of said body, and said footboard, dashboard and back being of such relative size and shape as to cover and inclose said seat.

3. The combination of a carriage-body, a seat therein, a footboard pivoted to said body, a dashboard pivoted to the footboard, braces and connections which support said footboard and dashboard in suitable relative positions when dropped down, and a back pivoted to said seat, the sides of said body, and said footboard, dashboard and back being of such relative size and shape as to cover and inclose said seat, substantially as specified.

4. The combination of a carriage-body, a seat therein, a footboard pivoted to said body, a dashboard pivoted to the footboard, a brace having a lock-knuckle at mid-length and pivoted at its respective ends to said body and said footboard, and a rod pivoted to said dashboard and having a sliding connection with said brace, substantially as specified.

5. The combination of a carriage-body, a seat therein, a footboard pivoted to said body, a dashboard pivoted to the footboard, a brace having a lock-knuckle at mid-length and pivoted at its respective ends to said body and said footboard and having a longitudinal slot, and a rod pivoted to said dashboard and to the slotted portion of said brace, substantially as specified.

6. The combination of a carriage-body, a seat therein, a footboard pivoted to the front end of said body and provided with a stop at its front edge, a footboard pivoted to said front edge and braces against said stop in its effective position, and supporting devices including a brace having a stop-knuckle which maintain said footboard and dashboard in suitable relative positions when dropped down, substantially as specified.

WILLIAM HERBERT NOYES.

Witnesses:
CHAS. LUTHER,
EDW. DUMMER.